(12) United States Patent  (10) Patent No.: US 6,517,174 B2
Sevier  (45) Date of Patent: Feb. 11, 2003

(54) EQUIPMENT MOUNTING RACKS AND CABINETS

(75) Inventor: Richard W. Sevier, Goleta, CA (US)

(73) Assignee: Hendry Telephone Products, Santa Barbara, CA (US)

( * ) Notice: Subject to any disclaimer, the term of this patent is extended or adjusted under 35 U.S.C. 154(b) by 0 days.

(21) Appl. No.: 09/844,541

(22) Filed: Apr. 27, 2001

(65) Prior Publication Data

US 2001/0015598 A1 Aug. 23, 2001

Related U.S. Application Data

(62) Division of application No. 09/103,347, filed on Jun. 23, 1998.

(51) Int. Cl.[7] .............................................. A47B 47/03
(52) U.S. Cl. ............................... 312/257.1; 312/265.5; 211/189
(58) Field of Search ........................... 312/265.1, 265.2, 312/265.3, 265.4, 265.5, 265.6, 111, 140, 257.1, 263; 211/26, 184, 189, 191; 361/724, 725; 52/653.1, 653.2

(56) References Cited

U.S. PATENT DOCUMENTS

| | | |
|---|---|---|
| 1,516,711 A | 11/1924 | Christell |
| 1,957,362 A | 5/1934 | Smith |
| 2,058,263 A | 10/1936 | Rosendale |
| 2,114,155 A | 4/1938 | Streich |
| 2,386,019 A | 10/1945 | Watter |
| 2,875,902 A | 3/1959 | Ayars, Jr. |
| 2,950,786 A | 8/1960 | Markle |
| 2,959,715 A | 11/1960 | Leonchick |
| 3,160,280 A | 12/1964 | Burch |
| 3,192,306 A | 6/1965 | Skonnord ............ 312/265.5 X |
| 3,265,419 A | 8/1966 | Durnbaugh et al. |
| 3,297,383 A | 1/1967 | Fay .......................... 312/257.1 |
| 3,420,381 A | 1/1969 | Bradfield ..................... 211/26 |
| 3,537,221 A | 11/1970 | Elfman et al. |
| 3,907,445 A | 9/1975 | Wendt ..................... 403/232.1 |
| 3,989,398 A | 11/1976 | Wendt ..................... 403/232.1 |

(List continued on next page.)

FOREIGN PATENT DOCUMENTS

| | | | |
|---|---|---|---|
| DE | 2609100 | 9/1997 | ............. 312/265.2 |
| FR | 2299544 | * 8/1976 | ............. 312/265.4 |
| GB | 815777 | 7/1959 | |
| GB | 983471 | 2/1965 | |
| GB | 2254962 | 10/1992 | |
| JP | 4419881 | 8/1969 | |

OTHER PUBLICATIONS

Lincoln Electric, "How Welding Simplifies the Design of Brackets", Product Engineering, 11/48.

(List continued on next page.)

*Primary Examiner*—James O. Hansen
(74) *Attorney, Agent, or Firm*—Koppel, Jacobs, Patrick & Heybl (57) ABSTRACT

An equipment mounting rack is composed of a seismically sound skeleton structure having spaced vertical uprights supplemented by distinct spaced equipment mounting structures attached to that skeleton structure and extending along these vertical uprights and constituting side wall structures of a mounting rack interior space. The distinct spaced equipment mounting structures may have elongate first sections extending along the spaced vertical uprights, and elongate second sections extending along these first sections and constituting side wall structures of a mounting rack interior space. Cabinet walls may be attached to the skeleton structure, and the equipment mounting structures may constitute inside such cabinet walls side wall structures of a mounting rack interior space. The vertical uprights advantageously are reinforced by elongate partial enclosures that may avoid the need for a large number of weakening mounting holes in these uprights.

13 Claims, 6 Drawing Sheets

U.S. PATENT DOCUMENTS

| | | |
|---|---|---|
| 4,141,054 A | 2/1979 | Colaiaco |
| 4,158,998 A * | 6/1979 | Clement .................. 211/191 X |
| 4,410,294 A | 10/1983 | Gilb |
| 4,422,792 A | 12/1983 | Gilb ........................ 403/232.1 |
| 4,453,472 A | 6/1984 | Ward ........................... 108/107 |
| 4,497,411 A | 2/1985 | Debortoli ...................... 211/26 |
| 4,553,674 A | 11/1985 | Yoshikawa et al. ........... 211/26 |
| 4,572,695 A | 2/1986 | Gilb ........................ 403/232.1 |
| 4,594,017 A | 6/1986 | Hills |
| 4,641,987 A | 2/1987 | Schlegel |
| 4,662,524 A | 5/1987 | Fullenkamp et al. |
| 4,690,286 A | 9/1987 | Horne et al. |
| 4,715,502 A | 12/1987 | Salmon ........................ 211/26 |
| 4,732,281 A | 3/1988 | Hall, II ........................ 211/26 |
| 4,899,892 A | 2/1990 | Rheault |
| 4,991,061 A | 2/1991 | Strange |
| 5,004,107 A | 4/1991 | Sevier et al. .................. 211/26 |
| D326,200 S | 5/1992 | Allen et al. ................... D6/479 |
| 5,165,770 A | 11/1992 | Hahn ...................... 312/265.4 |
| 5,214,572 A | 5/1993 | Cosimanio et al. |
| 5,284,254 A | 2/1994 | Rinderer ...................... 211/26 |
| 5,323,916 A | 6/1994 | Salmon ........................ 211/26 |
| 5,363,613 A | 11/1994 | Sevier .......................... 52/263 |
| 5,372,262 A | 12/1994 | Benson et al. ................ 211/26 |
| 5,441,337 A | 8/1995 | Mazura et al. ........ 312/257.1 X |
| 5,566,836 A | 10/1996 | Lerman ....................... 211/26 |
| 5,639,150 A | 6/1997 | Anderson et al. ..... 312/265.2 X |
| 5,664,380 A | 9/1997 | Hsueh ....................... 52/653.1 |
| 5,743,413 A | 4/1998 | Noll .......................... 211/60.1 |
| 5,806,820 A | 9/1998 | Simon ........................ 248/243 |
| 5,979,672 A | 11/1999 | Gemra et al. ................. 211/26 |
| 5,983,590 A | 11/1999 | Serban ....................... 52/656.1 |

OTHER PUBLICATIONS

David E. Kosanada, Design and Testing of an Earthquake–Resistant Electronic Equipment Rack, 1987, International Electronics Packaging Conference.

Seismic Simulation Test Program on Two LTS–1565 Equipment Racks, for Rockwell International, by Wyle Laboratories, Feb. 11, 1986.

Encarta Encyclopedia, "Archaeometry and Stonehenge" title page and pp. 1 and 2, May 7, 2000.

Collier's Encyclopedia, The Crowell–Collier Publishing Company, 1962, p. 545, the definition of "Stonehenge", using expression "uprights".

Channel Racks & Accessories, Hendry Telephone Products, Sep. 1996.

Earthquake Analysis of the Hendry Telephone Products ETSI Framework, Technical Audit Report AU–699, vol. 1, Issue 1, Aug. 1997.

* cited by examiner

EQUIPMENT MOUNTING RACKS AND CABINETS

CROSS REFERENCE TO RELATED APPLICATION

This is a division of patent application Ser. No. 09/103,347, filed Jun. 23, 1998 by the herein inventors, Richard W. Sevier and Dominic J. Louwagie, and incorporated by reference herein.

FIELD OF THE INVENTION

The subject invention relates to seismically sound equipment mounting racks and cabinets.

BACKGROUND OF THE INVENTION

There is a wide variety of equipment mounting racks and cabinets; but the need persists for more versatile rack and cabinet systems that are highly resistant to earthquakes and other calamities.

SUMMARY OF THE INVENTION

It is a general object of the invention to provide improved equipment racks and cabinets.

It is a germane object of the invention to provide versatile equipment racks and cabinets that comply with requirements of standardization or that otherwise fit standard or recurring environments.

It is a related object of the invention to provide earthquake-resistant equipment racks and cabinets.

The invention resides in an equipment mounting rack composed of a seismically sound skeleton structure having spaced vertical uprights supplemented by distinct spaced equipment mounting structures attached to that skeleton structure and extending along these vertical uprights and constituting side wall structures of a mounting rack interior space.

The invention resides also in an equipment mounting rack composed of a seismically sound skeleton structure having spaced vertical uprights supplemented by distinct spaced equipment mounting structures having elongate first sections extending along these spaced vertical uprights, and elongate second sections extending along these first sections and constituting side wall structures of a mounting rack interior space.

From another aspect thereof, the invention resides in an equipment mounting rack comprising, in combination, a seismically sound skeleton structure having spaced vertical uprights, spaced equipment mounting structures attached to that skeleton structure and extending along these vertical uprights, and cabinet walls attached to that skeleton structure, such equipment mounting structures constituting, inside these cabinet walls, side wall structures of a mounting rack interior space.

From a further aspect thereof, the invention resides in an equipment mounting rack comprising, in combination, a seismically sound skeleton structure having spaced vertical uprights, and each of said vertical uprights having an elongate upright partial enclosure and extending throughout said partial enclosure, said, partial enclosure having a main section extending in parallel to a main section of the corresponding vertical upright, a first lateral section extending from that main section in spaced relationship to a first side of that vertical upright and having a first extension engaging that first side of that vertical upright, and an opposite second lateral section extending from the main section in spaced relationship to an opposite second side of that vertical upright and having a second extension engaging that second side of that vertical upright.

From another aspect thereof, the invention resides in an equipment mounting rack comprising, in combination, a seismically sound skeleton structure having spaced vertical uprights, a cross piece structure attached to and extending between these vertical uprights, and forming a corner at a top of each of said vertical uprights and between each of said vertical uprights and said cross piece structure a strut plate extending inside of that vertical upright and inside said cross piece structure in spaced relationship to said corner, at an angle between each of these vertical uprights and that cross piece structure from a location on that vertical upright spaced along that vertical upright downwardly from that top to a location on said cross piece structure spaced along that cross piece structure from both of said spaced vertical uprights.

From a further aspect thereof, the invention resides in an equipment mounting rack comprising, in combination, a seismically sound skeleton structure having spaced vertical uprights, a cross piece structure attached to and extending between such vertical uprights, and a strut plate extending at an angle between each of these vertical uprights and tha cross piece structure. Each of these vertical uprights has an elongate upright partial enclosure having a main section extending in parallel to a main section of that vertical upright, a first lateral section extending from such main section in spaced relationship to an opposite second side of that vertical upright and having a second extension engaging that second side of that vertical upright.

From a further aspect thereof, the invention resides in an equipment mounting rack comprising, in combination, a seismically sound skeleton structure having spaced vertical uprights, each of these vertical uprights having an elongate upright partial enclosure having a main section extending in parallel to a main section of that vertical upright, a first lateral section extending from that main section in spaced relationship to a first side of that vertical upright and having a first extension engaging that first side of that vertical upright, and an opposite second lateral section extending from such main section in spaced relationship to an opposite second side of that vertical upright and having a second extension engaging that second side of that vertical upright; and distinct spaced equipment mounting structures attached to each elongate partial enclosure of the vertical uprights and constituting side wall structures of a mounting rack interior space.

From a further aspect thereof, the invention resides in an equipment mounting rack comprising, in combination, a seismically sound skeleton structure having spaced vertical uprights, a cross piece structure attached to and extending between such vertical uprights and forming a corner at each of these vertical uprights, and, between each of these vertical uprights and the cross piece structure, a strut plate extending inside of that vertical upright and inside such cross piece structure in spaced relationship to that corner at an angle from a location on that vertical upright spaced from that corner to a location on the cross piece structure spaced from that corner; each of the vertical uprights having an elongate upright partial enclosure having a main section extending in parallel to a main section of that vertical upright, a first lateral section extending from that main section in spaced relationship to a first side of that vertical upright and having a first extension engaging that first side of that vertical upright, and an opposite second lateral section extending from that main section in spaced relationship to an opposite second side of that vertical upright and having a second extension engaging that second side of that vertical upright.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which.

DESCRIPTION OF PREFERRED EMBODIMENTS

Figure 1:
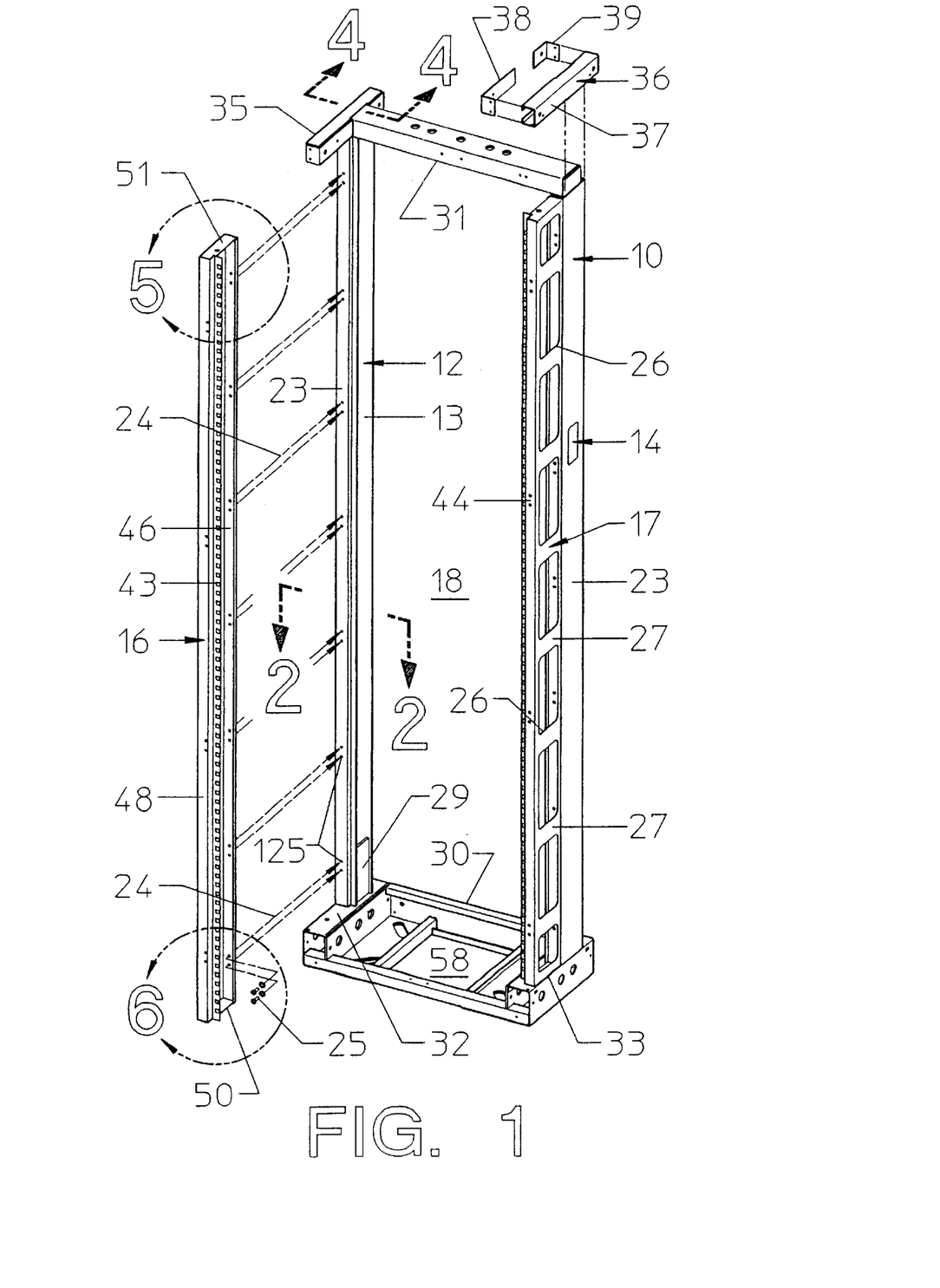
FIG. 1 is a partially exploded perspective view of an equipment mounting rack according to an embodiment of the invention.
Figure 2:
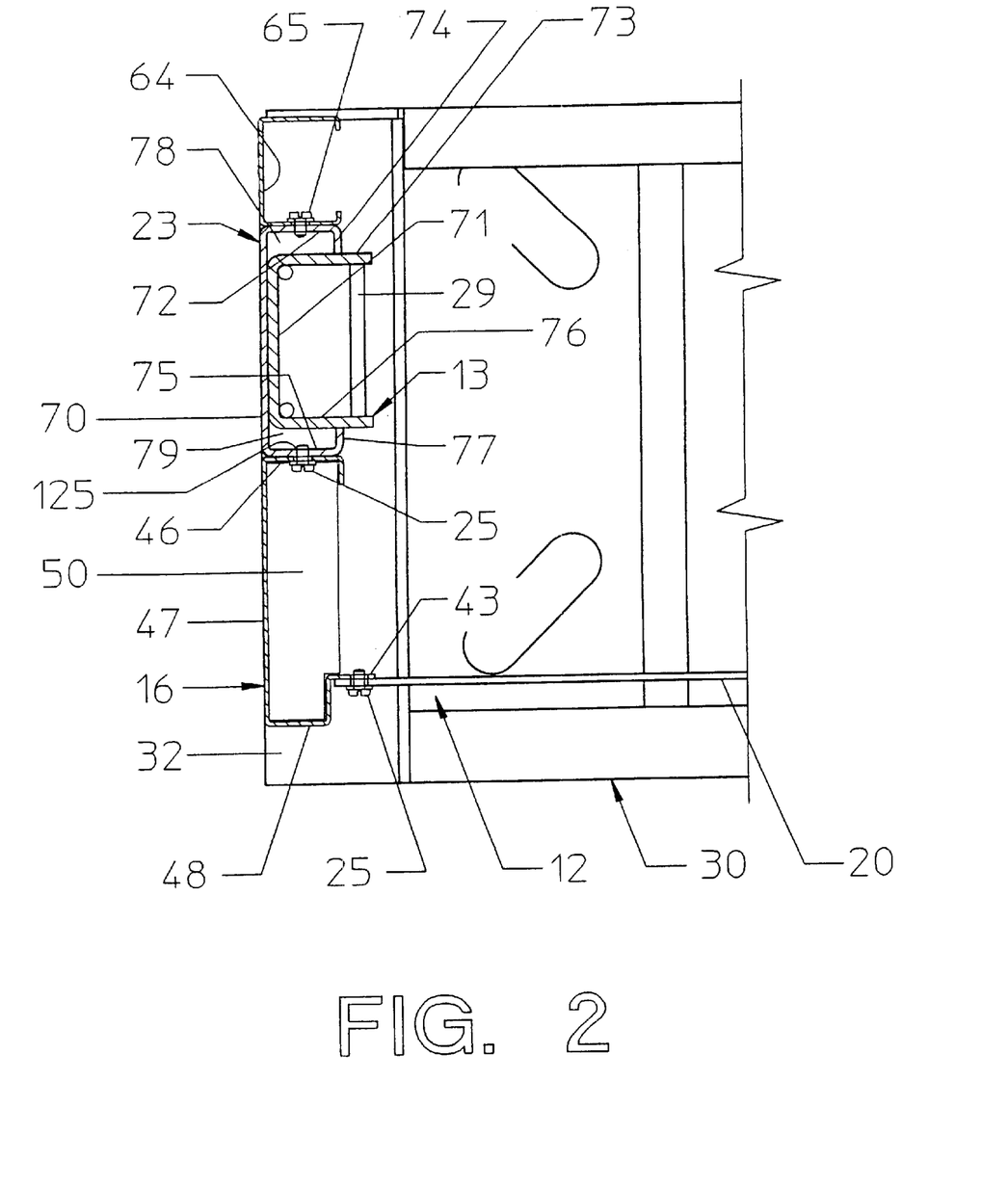
FIG. 2 is a detail view including a section taken on the line 2—2 in FIG. 1, on an enlarged scale.

An equipment mounting rack 10 is composed of a seismically sound skeleton structure 12 having spaced vertical uprights 13 and 14 supplemented by distinct spaced equipment mounting structures 16 and 17 attached to the skeleton structure and extending along the vertical uprights. These equipment mounting structures 16 and 17 in effect constitute side wall structures of a mounting rack interior space 18 in lateral extension of the vertical uprights, such as seen in FIGS. 1 and 2, and include means 43 for mounting equipment 20 and 21, such as seen in FIGS. 2 and 5 to 7.

Figure 7:
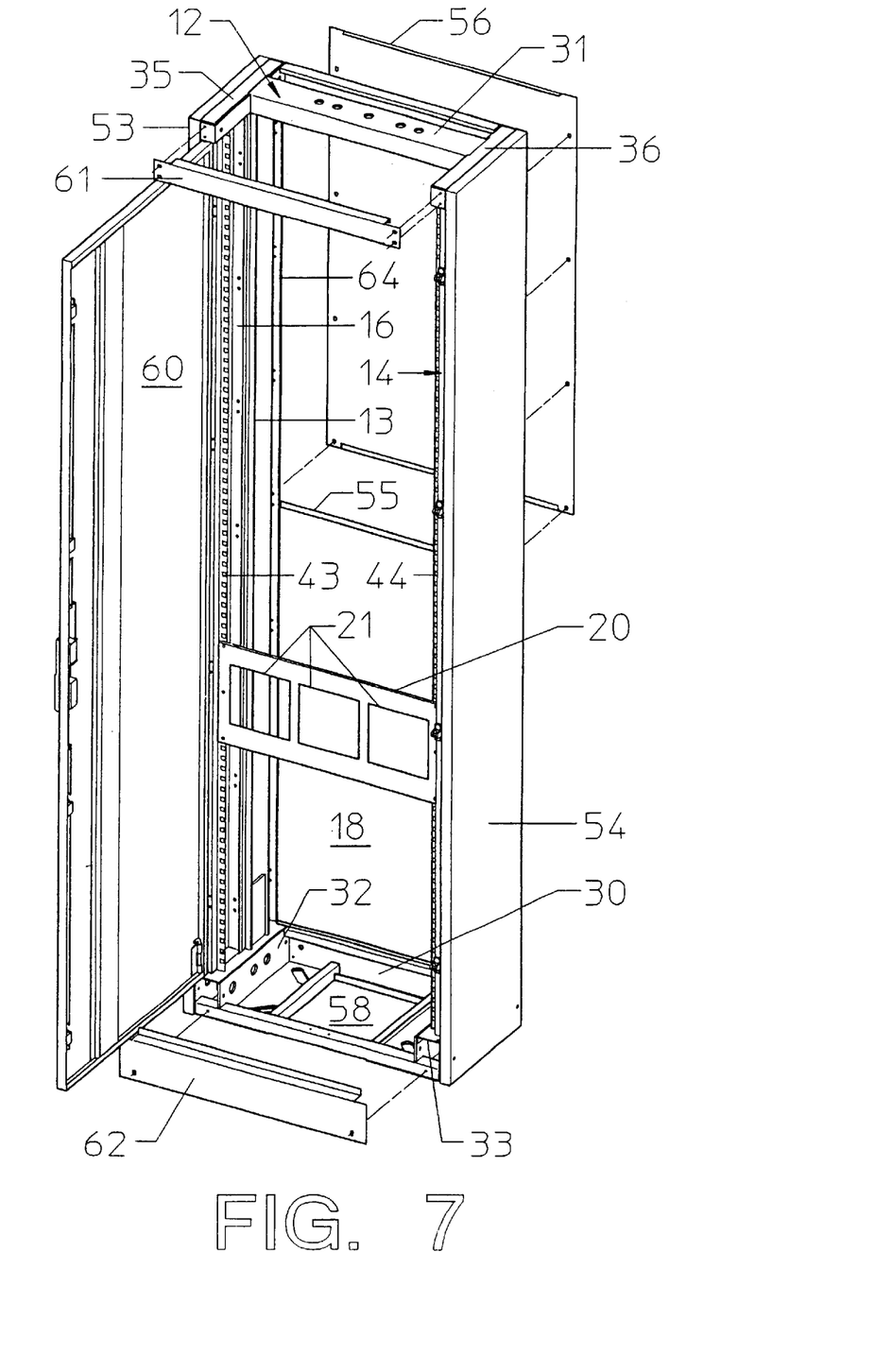
FIG. 7 is a partially exploded perspective view of a cabinet including an equipment mounting rack according to an embodiment of the invention.

Various pieces of equipment can be mounted on the structures 16 and 17. By way of example and not by way of limitation, FIGS. 2 and 7 show a mounting board 20 attached to the opposite mounting structures 16 and 17. Squares 21 in that mounting board either represent apertures for receiving equipment or symbolize equipment that may be mounted on the board 20 and thereby indirectly on the structures 16 and 17 in the rack interior 18. However, such or other equipment may be mounted on the structures 16 and 17 directly, as may various fiber optics or other lines, cables, wiring, etc.

In this respect and in general, the rack structure according to the invention is of wide utility, including facilities for mounting electrical and/or electronic equipment, facilities for mounting gas supply or transmission equipment, and facilities for mounting liquid fuel supply or transmission systems, or facilities for mounting fire-fighting equipment, hospital equipment and supplies, food and drink survival rations, and other articles, commodities and supplies needed for endurance of heavy earthquakes and other disasters, to name but a few examples where seismic stability and endurance are essential, especially in seismically active areas of the world.

The spaced equipment mounting structures 16 and 17 may be spaced from vertical uprights 13 and 14, or may be attached to such spaced vertical uprights.

Figure 3:
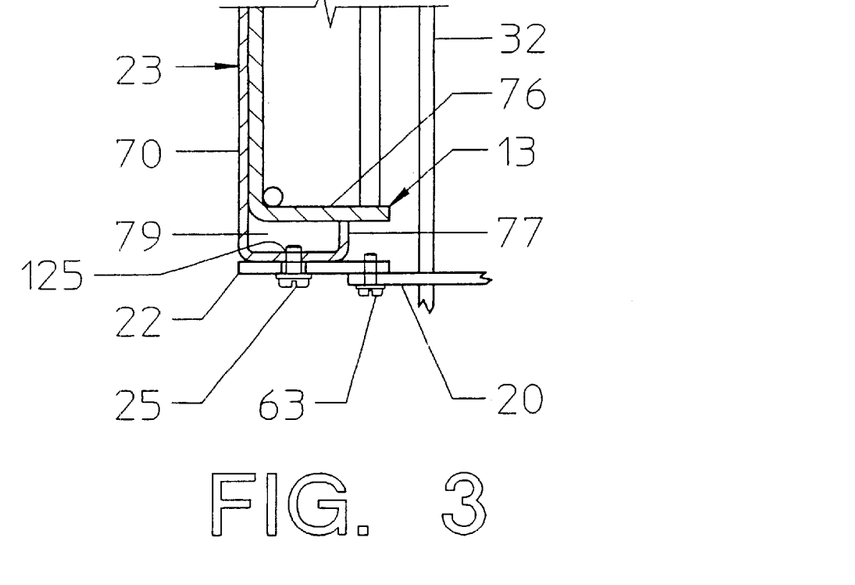
FIG. 3 is a modification according to an embodiment of the invention illustrated on an enlarged scale with the aid of a section similar to a detail of FIG. 2.
Figure 4:
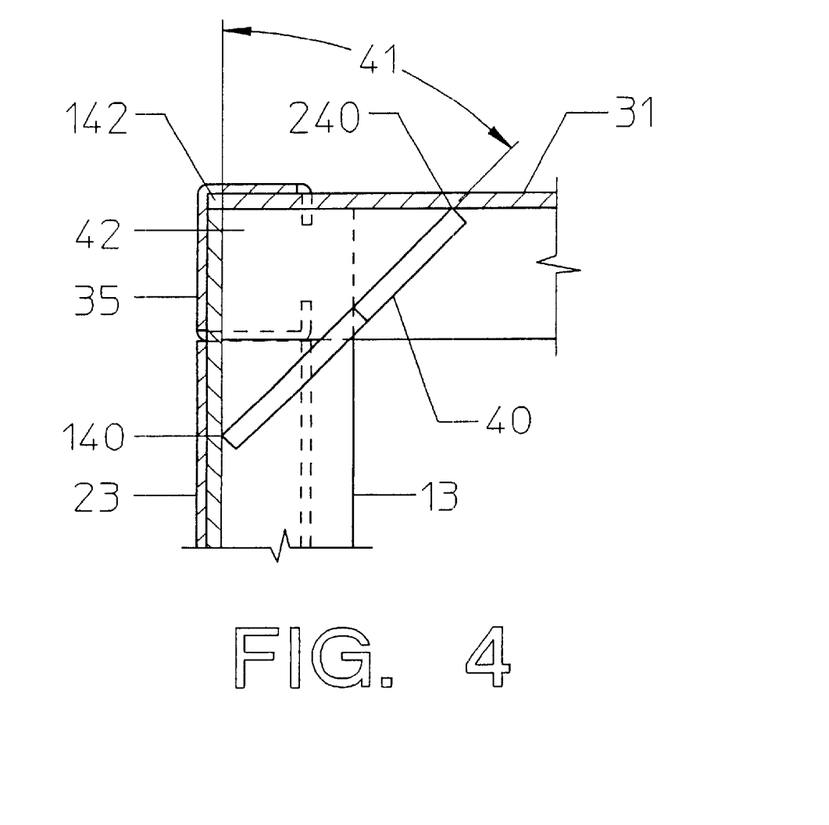
FIG. 4 is a section taken on the line 4—4 in FIG. 1.

According to an embodiment of the invention, the vertical uprights 13 and 14 have elongate partial enclosures 23 extending along these vertical uprights, such as shown in FIG. 2 on an enlarged scale for the vertical upright 13 of the seismically sound skeleton structure 12. As seen in FIGS. 1, 4 and 7, each such vertical upright extends throughout such partial enclosure. The spaced equipment mounting structures 16 and 17 may be attached to these elongate partial enclosures, such as shown at 24 in FIG. 1, indicating fasteners 25 and recurrent mounting holes 125 in said elongate partial enclosures, rather than in said vertical uprights. In this manner, any penetration or other weakening of uprights 13 and 14 of the seismically sound skeleton structure 12 by recurrent mounting holes or similar fastening devices can effectively be avoided, such as seen from FIGS. 2 and 3. Also, the partial enclosure 23 adds strength to the upright structure and avoids damage to cables and wiring, as more fully disclosed below.

Such partial enclosures may also be provided about other seismically sound structures. By way of example, and not by way of limitation, each of the vertical frame members of the equipment rack shown in U.S. Pat. No. 5,004,107, by coinventor Richard W. Sevier and by James J. Keenan, issued Apr. 2, 1991 to assignee Hendry Mechanical Works, may be equipped with such a partial enclosure.

According to the embodiment of the invention illustrated in FIG. 1 by way of example, the spaced vertical uprights 13 and 14 and the spaced equipment mounting structures 16 and 17 jointly constitute side wall structures of the mounting rack interior space 18. This is so, even if these mounting structures have large apertures 26, since an apertured wall is a wall nonetheless. These lateral apertures 26 permit fiber optics or other lines or cables or wiring to be conveniently run, and to be recurringly mounted or tied, such as at webs 27. For this reason or otherwise, the equipment mounting structures 16 and 17 maybe webbed.

In the illustrated embodiments of the invention, the seismically sound skeleton structure 12 includes cross piece structures 30 and 31 bracing the spaced vertical uprights 13 and 14 and the spaced equipment mounting structures 16 and 17.

The lower cross piece structure may be a base structure 30 included in the seismically sound skeleton structure 12 and carrying the spaced vertical uprights 13 and 14 and the spaced equipment mounting structures 16 and 17. An excellent example of a seismically sound base structure is disclosed in the above mentioned U.S. Pat. No. 5,004,107, which is herewith incorporated by reference herein. A bracing member 29 in FIGS. 1 and 2 is indicative of the intimate interconnection of the components of the seismically sound skeleton structure 12. Welding may be used extensively to brace the whole structure into one piece, so to speak.

These and other base structures in effect may have extensions 32 and 33 at the spaced vertical uprights 13 and 14, extending under the spaced equipment mounting structures 16 and 17, such as seen in FIGS. 1 and 7.

According to an embodiment of the invention, the seismically sound skeleton structure 12 includes cross piece structure 31 at tops of the spaced vertical uprights 13 and 14, opposite to the base structure 30. Such cross piece structure 31 preferably has transverse extensions 35 and 36 at spaced vertical uprights 13 and 14, extending over the tops of the equipment mounting structures 16 and 17. The upper exploded view in FIG. 1 shows an example of the cross piece extension 36 composed of a channel-shaped member 37 complemented by different angle members 38 and 39, welded or braced into one piece.

Further bracing is seen in the section shown in FIG. 4 for an upper corner of the seismically sound skeleton structure wherein a strut plate 40 extends at an angle 41, such as at 45 degrees to the vertical upright 13 and to the cross brace 31. The cross piece structure 31 attached to and extending between the vertical uprights 13 and 14 forms a corner 42 at a top 142 of each of the vertical uprights, such as shown for the vertical upright 13 in FIG. 4. Between each of these vertical uprights and that cross piece structure there is a strut plate 40 extending inside of that vertical upright and inside of the cross piece structure in spaced relationship to the corner 42 at an angle between each of these vertical uprights and that cross piece structure from a location 140 on that vertical upright spaced along that vertical upright downwardly from that top 142 to a location 240 on the cross piece structure 31 spaced along that cross piece structure from both of the spaced vertical uprights 13 and 14. Again, welding may be used to rigidify the skeleton structure with the strut 40 and with its counterpart in the other corner at 36.

Such bracing techniques, of course, are just some examples for providing the seismically sound structure within the scope of the invention herein disclosed.

In illustrated preferred embodiments of the invention, the spaced equipment mounting structures 16 and 17 have elongate mounting hole arrays 43 and 44 extending in parallel to the spaced vertical uprights 13 and 14, respectively. Equipment, parts or components may be mounted directly onto these arrays, or indirectly, such as shown at 20 and 21 in FIGS. 2 and 7 by way of example.

Figure 6:
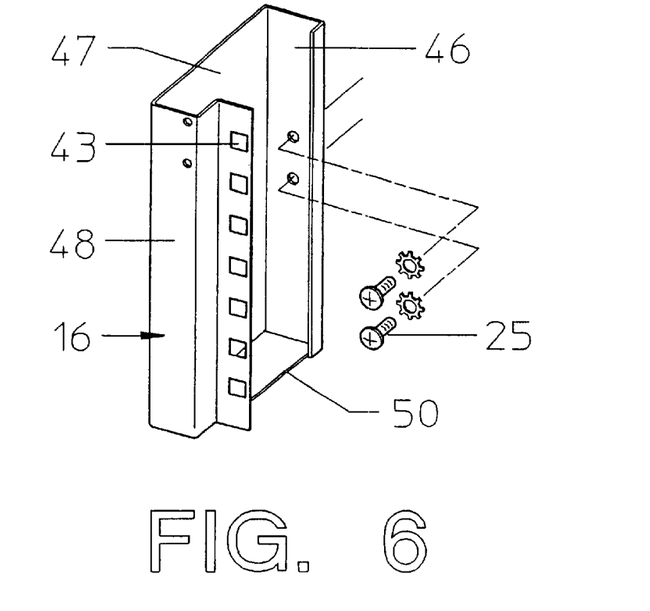
FIG. 6 is a detail view on an enlarged scale of that component within the circle 6 in FIG. 1.

A related embodiment of the invention provides an equipment mounting rack 10 composed of seismically sound skeleton structure 12 having spaced vertical uprights 13 and 14 supplemented by distinct spaced equipment mounting structures 16 and 17 having elongate first sections 46 extending along these spaced vertical uprights, and elongate second sections 47, seen particularly well in FIG. 6, extending along first sections 46 and constituting side wall structures of mounting rack interior space 18.

Elongate first sections 46 of the two mounting structures 16 and 17 may be attached to vertical uprights 13 and 14, or to their above mentioned elongate partial enclosures 23 extending along such vertical uprights.

The spaced vertical uprights 13 and 14 and the spaced equipment mounting structures 16 and 17, and particularly, their elongate second sections 47, may jointly constitute side wall structures of the mounting rack interior space 18.

In the illustrated embodiment of the invention, the spaced equipment mounting structures 16 and 17 have elongate third sections 48 extending along second sections 47. These elongate third sections 48 preferably are spaced from and extend substantially parallel to the first sections 46.

Figure 5:
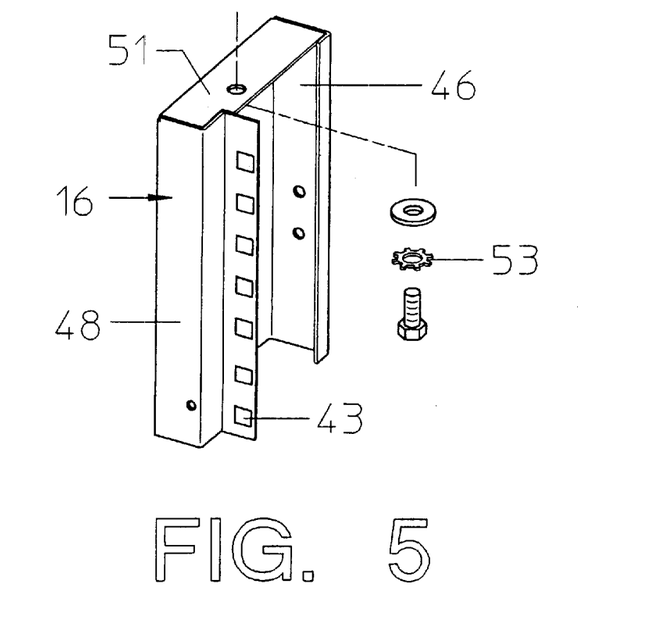
FIG. 5 is a detail view on an enlarged scale of a component within the circle 5 in FIG. 1.

According to a preferred embodiment of the invention, the spaced first and third sections 46 and 48 are interconnected by end plates 50 and 51 extending between these spaced first and third sections at opposite ends of the equipment mounting structures, such as shown in FIGS. 1, 5 and 6. In this or any other manner within the scope of the invention, each equipment mounting structure has a rigidifying frame structure 46-50-48-51 thereabout, or about its second or main section 47. The frame member or end plates 50 and 51 preferably are attached to or are one with that main section 47.

The distinct mounting structures 16 and 17 preferably are braced with or are at least connected to seismically sound skeleton structure, such as symbolically illustrated by a fastener 52 in FIG. 5 for one of the end plates. However, such distinct mounting structures 16 and 17 preferably are braced or are at least connected to seismically sound skeleton structure 12 on three sides each, such as at 46-23-13 or 14, 50-32 or 33 and 51-35 or 36.

The elongate mounting hole arrays 43 and 44 of the spaced equipment mounting structures preferably extend along or at least are at the elongate third sections 48. As seen best in FIGS. 5 and 6, the elongate mounting hole arrays 43 and 44 preferably are inwardly offset relative to the elongate third sections 48.

Figure 8:
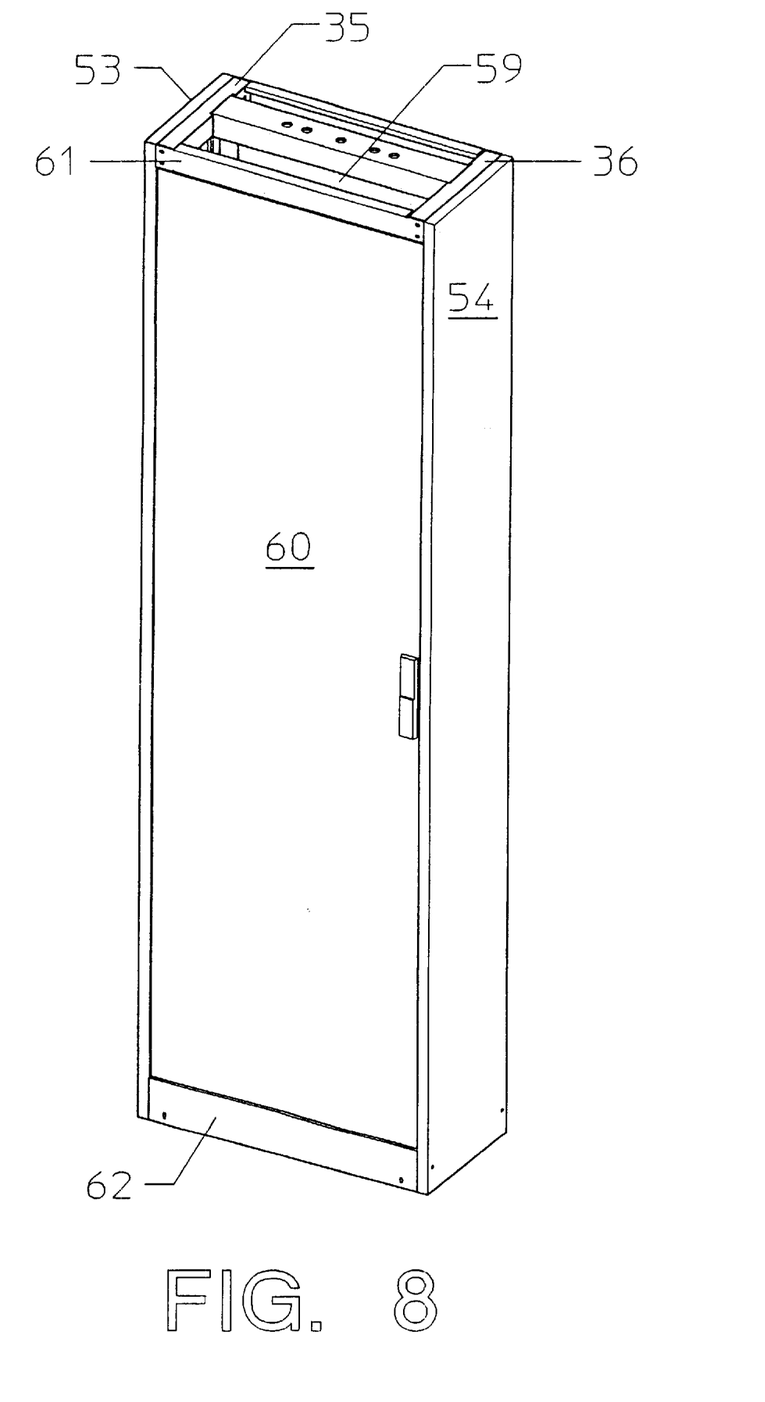
FIG. 8 is a perspective view similar to FIG. 7 showing the assembled cabinet enclosing the equipment mounting rack in a shut condition.

A special version of the equipment mounting rack according to a further embodiment of the invention is shown in FIGS. 7 and 8 by way of example.

Such special version is composed of the seismically sound skeleton structure 12 having spaced vertical uprights 13 and 14, spaced equipment mounting structures 16 and 17 attached to that skeleton structure, such as in any of the above mentioned manners, including intervening partial enclosure 23, and extending along vertical uprights 13 and 14, and cabinet walls 53, 54, 55, 56, etc., attached to skeleton structure 12. The equipment mounting structures 16 and 17 constitute inside the cabinet walls 53 and 54 side wall structures of the mounting rack interior space 18. In that case, the equipment mounting structures 16 and 17 and even the uprights 13 are 14 are inside walls, so to speak, and the cabinet walls 53, 54 are outside walls.

The seismically sound skeleton structure 12 includes a base structure 30, carrying the spaced vertical uprights 13 and 14 and having extensions 32 and 33 at the spaced vertical uprights extending under the spaced equipment mounting structures 16 and 17. Cabinet walls 53, 54 and 55 may be attached to such base structure 30, 32 and 33.

The seismically sound skeleton structure 12 shown in FIGS. 7 and 8 also includes a cross piece structure 31 at tops of the spaced vertical uprights 13 and 14 opposite said base structure 30, and such cross piece structure again has extensions 35 and 36 at the spaced vertical uprights 13 and 14 extending over the spaced equipment mounting structures 16 and 17. Cabinet walls 53, 54 and 56 may be attached to such top structure 31, 35, 36.

The equipment mounting rack preferably has a bottom opening 58 through which fiber optics or other lines or cables can be run, such as to and from a so-called computer floor or other supporting structure, or simply from the floor itself. Particularly suitable rigid supporting structures are shown and described in U.S. Pat. No. 5,363,613, by coinventor Richard W. Sevier, issued Nov. 15, 1994 to assignee Hendry Mechanical Works.

The equipment mounting rack also may have a top opening 59 through which fiber optics or other lines or cables can be run. In fact, such lines or cables may be run to and from openings 58 and 59 through the entire rack or cabinet.

The cabinet shown in FIGS. 7 and 8 may be completed by a hinged door structure 60, with top and bottom plates 61 and 62 being attached to the bottom and top structures 30 and 31.

FIGS. 2 and 7 show a spacer 64 between the rear of the upright 13 or upright enclosure 23 and the cabinet walls or panels 55 and 56. A similar spacer may be attached to the other upright 14 or to its upright enclosure which corresponds to upright enclosure 23. The cabinet walls or panels 55 and 56 may be attached to such spacers 64 on each back side of the vertical uprights 13 and 14.

A simple form of spacer is a rail with a C-shaped cross-section as seen in FIG. 2. One leg of that C-shaped cross-section is visible at 64 in FIG. 7. Alternatively, another equipment mounting structure similar to the equipment mounting structure 16 may be provided instead between the rear of the vertical upright 13 and the rear panels 55 and 56. In other words, the vertical upright structure 13 may be provided between two equipment mounting structures of the type shown at 16. Similarly, the vertical upright structure 14 may be provided between two equipment mounting structures of the type shown at 17 thereby almost doubling the interior rack volume 18 and the equipment mounting capacity.

Various features herein disclosed have utility of their own. For instance, an equipment mounting rack may have a seismically sound skeleton structure having spaced vertical uprights 13 and 14, and elongate partial enclosures 23 extending along such vertical uprights, with each of these elongate partial enclosures having a main section 70 extending in parallel to a main section 71 of the corresponding vertical upright 13, a first lateral section 72 extending from that main section 70 in spaced relationship to a first side 73 of that vertical upright and having a first extension 74 engaging that first side 73 of that vertical upright, and an opposite second lateral section 75 extending from the main section 70 in spaced relationship to an opposite second side 76 of that vertical upright and having a second extension 77 engaging that second side 76 of that vertical upright. According to the preferred embodiment shown in FIG. 2, the elongate partial upright enclosure 23 has a substantially C-shaped cross-section which has the vertical upright 13 between inwardly turned ends 74 and 77 of that C-shaped cross-section.

Spacings 78 and 79 are important to seismic stability, strength and utility of the overall vertical upright structures 13 and 14. As seen in FIG. 2, fasteners, such as fasteners 25 and 65 for equipment mounting structure 16, for a spacer 64 or for another equipment mounting structure instead thereof, extend into spaces 78 and 79, instead of through a wall of the seismically sound structure 12, such as the wall 73 or 76 of the upright 13. This not only avoids a weakening of the seismically sound structure by penetration of the uprights 13 and 14 with mounting holes and fasteners, but also precludes inside ends of such fasteners from penetrating into any space within uprights 13 and 14. This is particularly important in cases where customers or users of the rack add their own equipment using their own fasteners. In such cases, ends of such fasteners could penetrate into cables, lines, wiring, etc., at the uprights, with consequent damage and malfunction. Spaces 78 and 79 readily accommodate such projecting fastener portions within the scope of the invention.

This also applies to other versions within the scope of the invention. By way of example, FIG. 3 shows a version wherein a mounting plate is attached to the partial upright enclosure 23 by a fastener 25, and wherein an equipment mounting board, such as the above mentioned mounting board 20, is attached to such mounting plate by another fastener 63. In that case, neither fastener penetrates any wall 76 etc. of the upright 13. The same applies when equipment is directly attached to the mounting plate 22, or even to the partial enclosure 23.

The main sections 70 and 71 of the partial enclosure 23 and upright 71 may also be spaced from each other, to provide a spacing around the upright core from extension 74 to extension 77 of that partial enclosure 23.

The structure thus disclosed partakes of the advantage that tubular structures have in terms of strength and stability.

In combination with these features, or independently, an equipment mounting rack that comprises a seismically sound skeleton structure having spaced vertical uprights 13 and 14 and a cross piece structure 31 attached to and extending between such vertical uprights, includes a strut plate 40 extending at an angle 41 between each of these vertical uprights and that cross piece structure 31.

According to the preferred embodiment of this aspect of the invention illustrated in FIG. 4, such strut plate extends inside of each of the vertical uprights 13 and 14 and inside of the cross piece structure. Elongate partial enclosures 23 may extend along the vertical uprights 13 and 14, such as disclosed above with the aid of FIGS. 2 and 3.

Distinct spaced equipment mounting structures 16 and 17 may again be attached to the skeleton structure 12 and extend along vertical uprights 13 and 14 and may, for instance, constitute side wall structures of a mounting rack interior space 18.

This extensive disclosure will render apparent or suggest to those skilled in the art various modifications and variations within the spirit and scope of the invention.

I claim:

1. An equipment mounting rack comprising in combination:

a seismically sound skeleton structure having spaced vertical uprights, a cross piece structure attached to and extending between said vertical uprights, a strut plate extending at an angle between each of said vertical uprights and said cross piece structure;

each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright; and recurrent mounting holes in said elongate upright partial enclosure, rather than in said vertical uprights.

2. An equipment mounting rack comprising in combination:

a seismically sound skeleton structure having spaced vertical uprights, a cross piece structure attached to and extending between said vertical uprights, and a strut plate extending at an angle between each of said vertical uprights and said cross piece structure;

each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright;

wherein said elongate upright partial enclosure has a substantially C-shaped cross-section having said vertical upright between inwardly turned ends of said C-shaped cross-section.

3. An equipment mounting rack comprising in combination:
   a seismically sound skeleton structure having spaced vertical uprights,
   a cross piece structure attached to and extending between said vertical uprights, and
   a strut plate extending at an angle between each of said vertical uprights and said cross piece structure;
   each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright;
   wherein said seismically sound skeleton structure includes a base structure carrying said spaced vertical uprights.

4. An equipment mounting rack comprising in combination:
   a seismically sound skeleton structure having spaced vertical uprights,
   a cross piece structure attached to and extending between said vertical uprights, and
   a strut plate extending at an angle between each of said vertical uprights and said cross piece structure;
   each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright;
   wherein said cross piece structure is at tops of said spaced vertical uprights opposite said base structure.

5. An equipment mounting rack comprising in combination:
   a seismically sound skeleton structure having spaced vertical uprights,
   a cross piece structure attached to and extending between said vertical uprights, and
   a strut plate extending at an angle between each of said vertical uprights and said cross piece structure;
   each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright;
   wherein said strut plate extends inside of a vertical upright and inside said cross piece structure in spaced relationship to a corner between that vertical upright and said cross piece structure from a location on that vertical upright spaced along that vertical upright downwardly from a top of said corner to a location on said cross piece structure spaced along that cross piece structure from both of said spaced vertical uprights.

6. An equipment mounting rack comprising in combination:
   a seismically sound skeleton structure having spaced vertical uprights;
   a cross piece structure attached to and extending between said vertical uprights and forming a corner at each of said vertical uprights;
   between each of said vertical uprights and said cross piece structure a strut plate extending inside of that vertical upright and inside said cross piece structure in spaced relationship to said corner at an angle from a location on that vertical upright spaced from that corner to a location on said cross piece structure spaced from that corner,
   each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright; and
   recurrent mounting holes in said elongate upright partial enclosure, rather than in said vertical uprights.

7. An equipment mounting rack comprising in combination:
   a seismically sound skeleton structure having spaced vertical uprights;
   a cross piece structure attached to and extending between said vertical uprights and forming a corner at each of said vertical uprights; and
   between each of said vertical uprights and said cross piece structure a strut plate extending inside of that vertical upright and inside said cross piece structure in spaced relationship to said corner at an angle from a location on that vertical upright spaced from that corner to a location on said cross piece structure spaced from that corner,
   each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright;
   wherein said elongate upright partial enclosure has a substantially C-shaped cross-section having said vertical upright between inwardly turned ends of said C-shaped cross-section.

8. An equipment mounting rack comprising in combination:
- a seismically sound skeleton structure having spaced vertical uprights;
- a cross piece structure attached to and extending between said vertical uprights and forming a corner at each of said vertical uprights; and
- between each of said vertical uprights and said cross piece structure a strut plate extending inside of that vertical upright and inside said cross piece structure in spaced relationship to said corner at an angle from a location on that vertical upright spaced from that corner to a location on said cross piece structure spaced from that corner,
- each of said vertical uprights having an elongate upright partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in spaced relationship to an opposite second side of that vertical upright and having a second extension engaging said second side of that vertical upright;
- wherein said location on said vertical upright from which said strut plate extends is spaced along that vertical upright downwardly from a top of said corner, and said location on said cross piece structure is spaced on that cross piece structure from both of said spaced vertical uprights.

9. An equipment mounting rack comprising in combination:
- a seismically sound skeleton structure having spaced vertical uprights; and
- each of said vertical uprights having an elongate upright partial enclosure and extending along the full length of said partial enclosure, said partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in space relationship to an opposite second side of that vertical upright and having a second extension engaging said second side of that vertical upright.

10. An equipment mounting rack comprising in combination:
- a seismically sound skeleton structure having spaced vertical uprights;
- each of said vertical uprights having an elongate upright partial enclosure and extending along the full length of said partial enclosure, said partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in space relationship to an opposite second side of that vertical upright and having a second extension engaging said second side of that vertical upright; and
- recurrent mounting holes in said elongate upright partial enclosure, rather that in said vertical uprights.

11. An equipment mounting rack comprising in combination:
- a seismically sound skeleton structure having spaced vertical uprights; and
- each of said vertical uprights having an elongate upright partial enclosure and extending along the full length of said partial enclosure, said partial enclosure having a main section extending in parallel to a main section of that vertical upright, a first lateral section extending from said main section in spaced relationship to a first side of that vertical upright and having a first extension engaging said first side of that vertical upright, and an opposite second lateral section extending from said main section in space relationship to an opposite second side of that vertical upright and having a second extension engaging said second side of that vertical upright;
- wherein said elongate upright partial enclosure has a substantially C-shaped cross-section having said vertical upright between inwardly turned ends of said C-shaped cross-section.

12. An equipment mounting rack comprising in combination:
- a seismically sound skeleton structure having spaced vertical uprights;
- a cross piece structure attached to and extending between said vertical uprights and forming a corner at a top of each of said vertical uprights; and
- between each of said vertical uprights and said cross piece structure a strut plate extending inside of that vertical upright and inside said cross piece structure in spaced relationship to said corner at an angle between each of these vertical uprights and that cross piece structure from a location on that vertical upright spaced along that vertical upright downwardly from said top, and extending to a location on that cross piece structure spaced along that cross piece structure from both of said spaced vertical uprights.

13. A rack as in claim 12, including:
- elongate upright partial enclosures extending along said vertical uprights.

* * * * *